(12) United States Patent
Waller et al.

(10) Patent No.: US 10,892,466 B2
(45) Date of Patent: Jan. 12, 2021

(54) ELECTRICAL ENERGY STORAGE CELL WITH INTEGRATED BRIDGING DEVICE

(71) Applicant: FRAUNHOFER-GESELLSCHAFT ZUR FOERDERUNG DER ANGEWANDTEN FORSCHUNG E.V., Munich (DE)

(72) Inventors: Reinhold Waller, Neunkirchen/Br. (DE); Vincent Lorentz, Erlangen (DE); Martin Maerz, Nuremberg (DE)

(73) Assignee: FRAUNHOFER-GESELLSCHAFT ZUR FOERDERUNG DER ANGEWANDTEN FORSCHUNG E.V., Munich (DE)

( * ) Notice: Subject to any disclaimer, the term of this patent is extended or adjusted under 35 U.S.C. 154(b) by 169 days.

(21) Appl. No.: 16/301,469

(22) PCT Filed: May 16, 2017

(86) PCT No.: PCT/EP2017/061655
§ 371 (c)(1),
(2) Date: Nov. 14, 2018

(87) PCT Pub. No.: WO2017/198636
PCT Pub. Date: Nov. 23, 2017

(65) Prior Publication Data
US 2019/0131611 A1    May 2, 2019

(30) Foreign Application Priority Data

May 17, 2016   (DE) .......................... 10 2016 208 421

(51) Int. Cl.
*H01M 2/34* (2006.01)
*H01M 2/02* (2006.01)

(52) U.S. Cl.
CPC ............. *H01M 2/34* (2013.01); *H01M 2/021* (2013.01); *H01M 2/0285* (2013.01)

(58) Field of Classification Search
CPC ....... H01M 2200/00; H01M 2200/103; H01M 2/34
See application file for complete search history.

(56) References Cited

U.S. PATENT DOCUMENTS

| 4,879,188 A | 11/1989 | Meinhold et al. ................. 429/7 |
| 2003/0027036 A1* | 2/2003 | Emori ................... H01M 10/42 429/61 |

(Continued)

FOREIGN PATENT DOCUMENTS

| DE | 10 2013 205 062 A1 | 9/2014 | ............. H01M 2/34 |
| DE | 10 2013 218 933 A1 | 3/2015 | .......... H01M 10/052 |
| WO | WO 01/83182 A1 | 11/2001 | ............. C06B 45/12 |

OTHER PUBLICATIONS

International Search Report dated Jul. 12, 2017 in related application No. PCT/EP2017/061655.

(Continued)

*Primary Examiner* — Maria Laios
(74) *Attorney, Agent, or Firm* — Renner Kenner Greive Bobak Taylor & Weber

(57) ABSTRACT

The present invention describes an electrical energy storage cell with a bridging device. The energy storage cell has an at least partially electrically conductive housing (10), at least two terminals (11, 12) on the housing (10), of which a first terminal (12) is insulated from the housing (10) and a second terminal (11) is electrically conductively connected to the housing (10), and a bridging device, which can be actuated by an external signal to connect the two terminals (11, 12) of the energy storage cell electrically to each other. The energy storage cell is characterised in that the bridging device acts between the first terminal (12) and the housing (Continued)

(10) of the energy storage cell. A robust construction which is inexpensive to assemble can be implemented as a result.

14 Claims, 2 Drawing Sheets

(56) References Cited

U.S. PATENT DOCUMENTS

| | | | |
|---|---|---|---|
| 2006/0199077 A1* | 9/2006 | Iwanaga | H01M 10/0567 |
| | | | 429/231.3 |
| 2012/0315518 A1* | 12/2012 | Langheim | H01M 2/34 |
| | | | 429/61 |
| 2013/0011511 A1 | 5/2013 | Han et al. | 429/208 |
| 2013/0252039 A1 | 9/2013 | Vom Dorp et al. | 429/61 |
| 2014/0170450 A1* | 6/2014 | Takahashi | H01M 2/1686 |
| | | | 429/62 |

OTHER PUBLICATIONS

Written Opinion dated Jul. 12, 2017 in related application No. PCT/EP2017/061655.

* cited by examiner

ELECTRICAL ENERGY STORAGE CELL WITH INTEGRATED BRIDGING DEVICE

CROSS-REFERENCE TO RELATED APPLICATION

This is a § 371 application of International patent application number PCT/EP2017/061655 filed May 16, 2017, which claims the benefit of German patent application number 10 2016 208 421.6, filed May 17, 2016, and which are incorporated herein by reference.

TECHNICAL FIELD

The present invention relates to an electrical energy storage cell which has an at least partially electrically conductive housing, at least two terminals on the electrically conductive housing, of which a first terminal is insulated from the housing and a second terminal is electrically conductively connected to the housing, and a bridging device, which can be actuated by an external signal to connect the two terminals of the energy storage cell electrically to one another.

Electrical energy storage cells, in particular galvanic cells, are generally connected to one another in series in order to form a battery. The reliability of the overall system, i.e. the battery formed from the individual cells, is an important criterion here. Without further measures, the entire system would fail in the event of the failure of one cell in the case of a series connection of this kind, although the battery would still comprise a sufficient number of intact cells. Defective cells must therefore be electrically bridged during operation in order to avoid this problem. Here, it is known to provide each of the individual cells with a bridging element, which in the event of a fault produces an electrical connection between the terminals of the faulty cell, either automatically or by external triggering, and thus bridges said faulty cell in the series connection.

PRIOR ART

For example, DE 37 21 754 A1 discloses a bridging device for safeguarding the energy storage cells of a battery, which bridging device enables an irreversible bridging of destroyed cells which have failed with high impedance. The bridging device consists of two layered semiconductor components arranged in series, each having different current/voltage characteristics. In the event of high-impedance failure of a destroyed storage cell, the high charging current flows through the two semiconductor components, which break down on account of the resultant high increase in temperature and thus short circuit the storage cell irreversibly with low impedance. A passive bridging device of this kind, however, is triggered only if the accumulator cell is already heavily degraded. Premature triggering, for example to prevent high power losses, is not possible.

DE 10 2012 005 979 A1 describes an electrical bridging element for the bridging of defective storage cells in energy stores, which bridging element is in principle also suitable for batteries of high electrical power. In this bridging element a layer sequence comprising at least one electrical insulation layer and one or more reactive layer stacks, in which an exothermic reaction can be triggered, is formed between two electrical conductors. The reactive layer stacks and the insulation layer are coordinated with one another such that the insulation layer dissolves due to the heat energy released during the exothermic reaction and an electrical connection is produced between the electrical conductors.

US 2012/0315518 describes an electrically triggerable bridging element based on an insulating body between two electrical contacts, which insulating body can be melted or softened by a heating element. These electrical contacts are connected to the two terminals of the energy storage cell that is to be bridged as necessary. In order to keep the trigger energy low, the insulating body must consist of material that melts at a low temperature. Waxy materials in particular are suitable for this purpose. These materials, however, tend towards heavy creepage already at the upper end of the temperature range of many storage cells, for example conventional Li-ion cells (60 to 80° C.), whereby the risk of undesirable triggering of the bridging element increases with time. It is thus impossible to achieve long-term stability. If a somewhat more stable material having a low melting point is used as insulating body, a significantly increased trigger energy is thus necessary for the triggering. A plate of 5×5×1 mm³ made of LD polyethylene, for example in order to heat up from room temperature to a softening point of 100° C., thus requires an energy quantity of approximately 3.5 J. Furthermore, in the case of this bridging element there is also the risk that residues of the insulation material will remain in the contact region, whereby the residual resistance in the event that the bridging element is triggered can present very high parameter fluctuations.

A primary problem of the previously available solutions is constituted by the overall cost to produce a battery system formed of a number of storage cells, with the assembly costs in particular for the mounting of the bridging devices on the individual storage cells contributing towards this. This assembly effort can also increase the susceptibility to failure of the battery system.

The object of the present invention lies in providing an electrical energy storage cell that has a bridging device which can be produced economically and which has a high mechanical robustness.

DISCLOSURE OF THE INVENTION

The object is achieved by the electrical energy storage cell according to claim 1. Advantageous embodiments of the energy storage cell are the subject of the dependent claims or can be deduced from the following description and the exemplary embodiments.

The proposed energy storage cell has an at least partially electrically conductive housing, at least two terminals or cell connections on the housing, and a bridging device, which can be actuated by an external signal to connect the two terminals of the energy storage cell electrically as required. The bridging device is triggered by an external trigger signal, for example a current or voltage pulse. A first terminal of the energy storage cell is insulated here from the housing, and a second terminal is electrically conductively connected to the housing, as is usual in energy storage cells. The proposed energy storage cell is characterised in that the bridging device acts between the first terminal and the housing of the energy storage cell.

The housing does not have to be completely electrically conductive, but must be electrically conductive at least in a housing region between the two terminals which comprises the two terminals or extends at least close to the two terminals. It is preferable, however, if the housing is completely electrically conductive.

In the proposed embodiment of the energy storage cell with the bridging device, the bridging mechanism acts between the first terminal and a contact point on the housing or on the electrically conductive housing region. This enables a robust construction, since the bridging device does not have to be mechanically connected to both terminals of the energy storage cell. This is also associated with a reduction of the production costs, in particular the assembly costs, of battery systems in which energy storage cells of this kind are used. In the proposed embodiment the bridging device can also be directly integrated in the energy storage cell.

In a preferred embodiment the bridging device is therefore integrated in the first terminal of the energy storage cell, which is shaped accordingly for this purpose.

The bridging device, when actuated by the external signal, preferably produces an electrical connection between a first and a second electrical conductor, wherein the first electrical conductor is connected to the first terminal of the energy storage cell or is formed by the first terminal of the energy storage cell. The second electrical conductor is connected to the housing of the energy storage cell.

In a preferred embodiment the bridging device comprises an electrically conductive bridging element, which is formed by a resilient element or is connected to a resilient element. The resilient element is held in a prestressed first state by a retaining wire and, when severed or dissolved, transitions into a second state, in which it electrically connects the first and second electrical conductors via the electrically conductive bridging element. When the bridging device is actuated by the external signal, the retaining wire is severed or dissolved accordingly. This can be achieved by a suitably high current or current pulse, which is conducted through the retaining wire, whereby said wire melts or burns through. The retaining wire can also be formed from a reactive material, in which an exothermic reaction can be triggered by the current or current pulse, wherein the retaining wire loses its retaining effect as a result of said exothermic reaction.

In a development of the preferred embodiment described above, the first and second electrical conductors are arranged such that at least one first surface region of the first conductor oriented in one spatial direction is distanced by a gap from at least one second surface region of the second conductor oriented in the same spatial direction. The orientation of a surface region in a spatial direction is to be understood here to mean that the surface region is recognised as a surface area from this spatial direction. In particular, it should be clarified here that the two surface regions are neither directed towards one another nor arranged at a right angle to one another. The bridging element is arranged above the two surface regions and connected to the resilient element such that the resilient element presses against the surface regions of the two electrical conductors in the event that the retaining wire is severed or dissolved. The bridging element and resilient element are embodied here as separate elements, wherein the bridging element must have a sufficient stiffness. The bridging element can be embodied for this purpose for example as a metal plate or as part of a printed circuit board with surface metallisation. For example, a spring element can be used as resilient element.

The above-mentioned surface regions of the electrical conductors and/or a side of the bridging element directed towards these surface regions are/is preferably provided with a solderable, electrically conductive coating, and an additional reactive element is arranged above the surface regions, for example as a further layer of the bridging element or as a separate element, in which reactive element an exothermic reaction is triggered by the actuation of the bridging device by the external signal, the heat generated by said reaction fusing the solderable layers to one another and/or producing a soldered connection between the bridging element and the two electrical conductors. In a design as a separate element the reactive element preferably bears against the bridging element, but is not connected to the bridging element in an integrally bonded manner.

An example of a reactive element or a reactive layer is a reactive nano foil, for example a reactive Ni/Al foil, as is known for example from WO 01/83182 A1. Nano foils of this kind are composed of a large number of nano layers, for example with layer thicknesses in the range of from 1 nm to 500 nm, wherein layers formed of two different materials which react exothermically with one another by suitable energy input generally alternate with one another. Other reactive layers also can be used in the proposed bridging element, for example layers of nano-thermite or other materials that react exothermically.

In an alternative development of the above-explained preferred embodiment, the electrically conductive bridging element itself is formed as a resilient element. This is preferably a planar element which is fixedly connected at one end to the first electrical conductor and is held in a curved, prestressed state at a distance from the second electrical conductor by the retaining wire. When the retaining wire is severed or dissolved, the bridging element then moves against the second electrical conductor and thus closes the contact between the two electrical conductors on account of its prestress.

In a further preferred embodiment the first and second electrical conductors are again arranged such that at least one first surface region of the first conductor oriented in one spatial direction is distanced by a gap from at least one second surface region of the second conductor oriented in the same spatial direction. An electrically conductive bridging element is arranged above the two surface regions, wherein the surface regions and/or a side of the bridging element directed towards the surface regions are/is provided with a solderable, electrically conductive coating. A reactive element, in particular in the form of a reactive nano foil, is also arranged above the two surface regions, in which reactive element an exothermic reaction is triggered by the actuation of the bridging device by the external signal, the heat generated by said reaction fusing the solderable layers to one another and/or producing a soldered connection between the bridging element and the two electrical conductors. The reactive element can be provided here in the form of a reactive layer as part of the bridging element or also as a separate element. In a design in the form of a separate element, the reactive element preferably bears against the bridging element, but is not connected to the bridging element in an integrally bonded manner.

The last-mentioned embodiments with the retaining wire and the reactive layer or the reactive element have the advantage that the bridging device can be triggered by an electrical pulse with a trigger energy between 10 and 1000 mJ. The risk of a false triggering by electromagnetic interference or ESD events is thus minimised. In principle, a minimum energy of 1 mJ is required, up to which value an absence of triggering can be ensured. On the other hand, in the case of a fully discharged cell, triggering is possible only if the required trigger energy is held ready in a local store in the monitoring electronics, for example a capacitor. In order to keep the costs for this store under a certain limit, reliable triggering should be implemented already from an energy of 500 mJ. This precondition can also be satisfied by the use of the retaining wire or fuse wire and the reactive layer or the reactive element. These can be dimensioned readily such that they satisfy the above requirements. The proposed embodiments also do not demonstrate any problems in respect of long-term stability, i.e. a required service life of >10, preferably 15 years at 60° ambient temperature, over which the failure rate of the bridging device must not rise significantly.

By suitable embodiment of the electrically conductive bridging element, a residual resistance of the triggered bridging element of <50 µΩ can be observed. This enables a thermal dissipation of the power loss in the triggered state of the bridging element, even at the continuous currents of several 100 amperes, momentarily also up to several 1000 amperes, occurring in typical applications. With triggering of the bridging device in the presented embodiments, there is furthermore only a short time delay between the sending of the electrical trigger pulse and the bridging of the cell, said delay being between 1 ms and 20 ms.

The described embodiments can each be implemented such that the trigger input is electrically connected to one of the two electrical conductors, and thus also to a terminal of the energy storage cell, via the retaining wire or the reactive layer and the bridging element in the non-triggered state. This makes it possible to perform cell diagnosis functions via the trigger input.

BRIEF DESCRIPTION OF THE DRAWINGS

The proposed electrical energy storage cell with externally triggerable bridging device will be explained again in greater detail further below with reference to exemplary embodiments in conjunction with the drawings, in which.

EMBODIMENTS OF THE INVENTION

Figure 1:
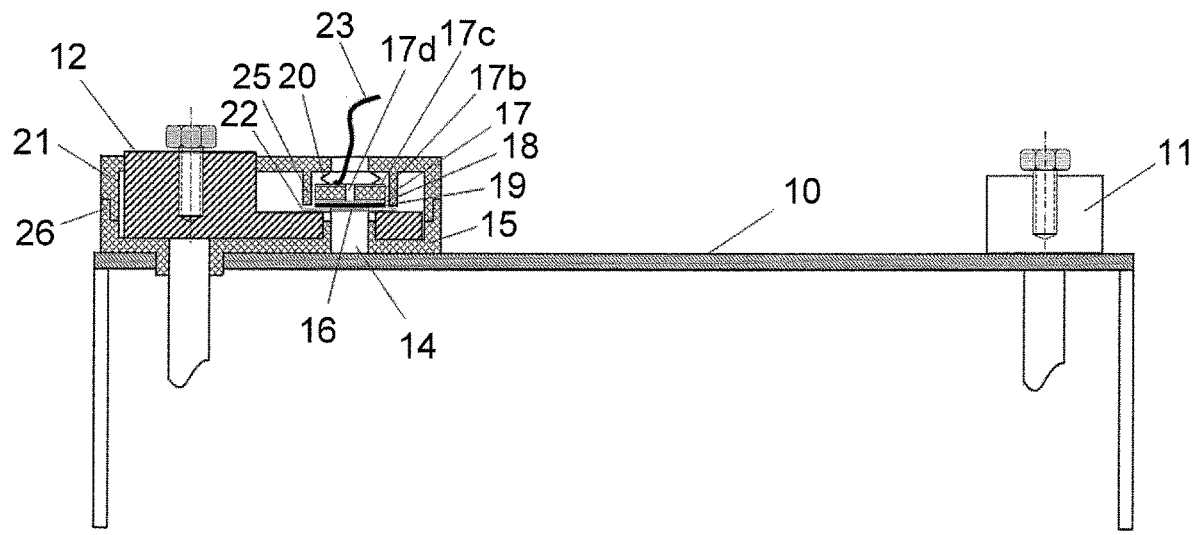
FIG. 1 shows a first example of an embodiment of the bridging device on the energy storage cell.
Figure 1:
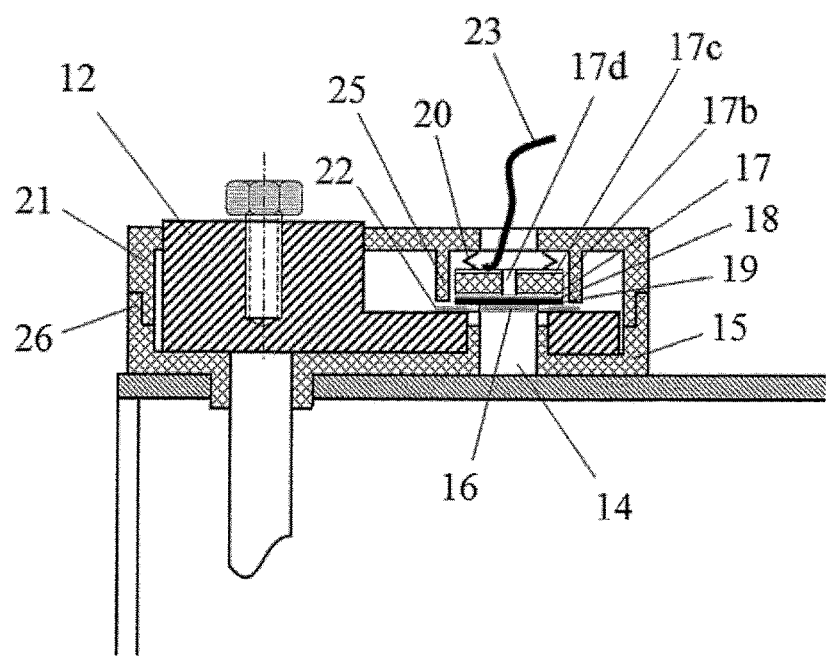

FIG. 1 shows, in the upper sub-image a), an exemplary embodiment of the proposed energy storage cell with the integrated bridging device in cross-section. The energy storage cell, as is known, in this case has the two terminals 11, 12, which protrude from the housing 10. The housing 10 is electrically conductive at least on its upper side, wherein the second battery terminal 11 is electrically conductively connected to the housing and the first battery terminal 12 is insulated from the housing 10. The insulated battery terminal 12 comprises a recess with an aperture. A contact part 14 is placed in said aperture as electrical conductor of the bridging device, which is electrically conductively connected to the housing 10 and thus also to the non-insulated second battery terminal 11. The insulation body 15, which insulates the first battery terminal 12 from the battery housing 10, advantageously forms a collar, which centres the contact part 14 within the aperture and insulates it reliably. The surface of the recess of the battery terminal 12 is coated in a ring around the aperture with a material having a low melting point, preferably a solder material 22, as can be seen in the enlarged view in the lower sub-image b) of FIG. 1. The contact part 14 is likewise coated on the upper side with a material having a low melting point, preferably a solder material 16. The height conditions are selected such that the upper side of the solder coating 16 of the contact part 14 protrudes beyond the upper side of the solder coating 22 of the adjacent surface regions of the battery terminal 12, advantageously by approximately 0.2 mm.

An electrically conductive foil 19 formed from a reactive nano material is placed over these surface regions of the battery terminal 12 and of the contact part 14, and a contact plate 17, preferably made of copper, having a solder coating 18 on the side facing towards the reactive foil 19 is placed on top of said electrically conductive foil. The reactive foil lies here on the solder coating 16 of the contact part 14, but is distanced from the solder coating 22 of the battery terminal 12 on account of the above-described height conditions. If the reactive foil is ignited via the trigger signal line 23, the solder material of the solder coatings 16, 18 and 22 thus melts on both sides of the reactive foil as a result of the released thermal energy, and the contact plate 17 is soldered to the contact part 14 and the battery terminal 12. The contact plate 17 is pressed here via the resilient spring element 20 against the surfaces of the battery terminal 12 and the contact part 14. By means of the solder connection, the battery cell is bridged reliably and in a stable manner in the long term with a very low resistance of typically several 10µΩ.

In a particularly advantageous embodiment, the contact plate 17 consists of a printed circuit board 17b, which is coated on both sides by a surface metallisation 17c, for example made of copper. The metal or copper thickness of this surface metallisation on the contact side towards the contact part 14 is advantageously in the range of from 100 to 300 µm. The printed circuit board material ensures mechanical stability, and with its low thermal conductivity ensures that a minimal amount of the energy released at the time of ignition of the reactive foil is lost, unused. The upper surface metallisation 17c of the printed circuit board 17b is preferably used as a contact face for the trigger signal. To this end, the trigger signal line 23 for example can be soldered to this upper surface metallisation 17c, or the face can be contacted by any other mechanical contact solutions. To pass the trigger signal through the printed circuit board 17b to the reactive foil 19, the printed circuit board 17b is advantageously provided with at least one via 17d.

The resilient element 20 fixes the position of the contact plate 17 and reactive foil 19 on the contact part 14 and ensures that, when energy is released suddenly following the ignition of the reactive foil 19, the contact plate 17 is not pushed away, but is pressed into the melted solder.

To facilitate assembly, the upper insulation body 21 produced preferably from plastic advantageously has a structure 25 which defines the lateral position of the contact plate 17. The insulation body 21 preferably also has a recess 26, such that the upper insulation body 21 and the lower insulation body 15 latch with one another mechanically reliably—and cannot be released again without being damaged—and thus form a housing for the bridging device. This is shown schematically in the drawing.

Figure 2:
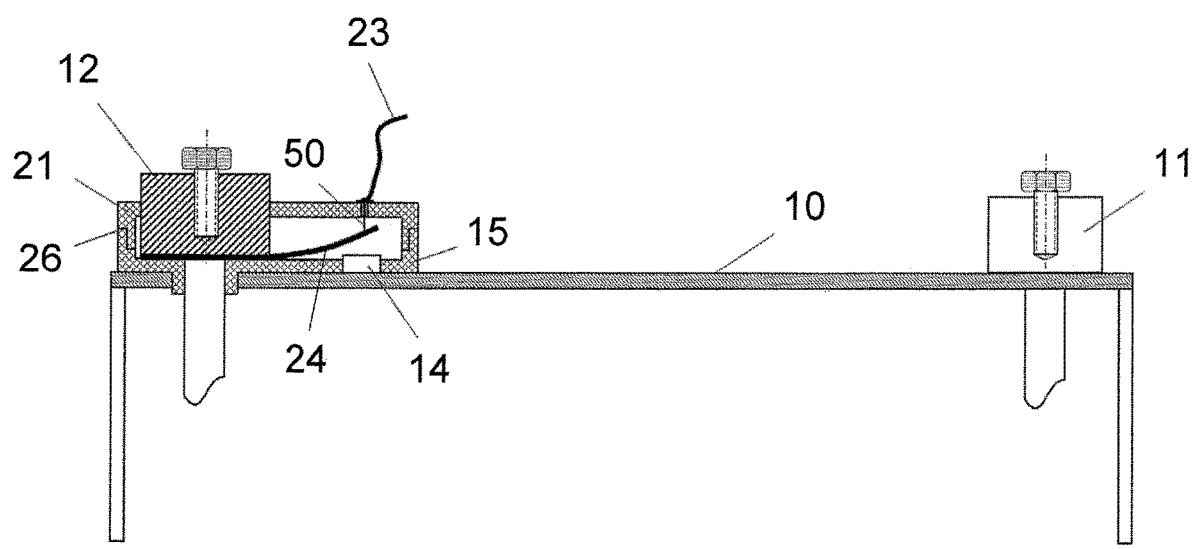
FIG. 2 shows a second example of an embodiment of the bridging device on the energy storage cell.

FIG. 2 shows a further exemplary embodiment of the bridging device. In this embodiment an electrically conductive contact plate 24 is connected to the battery terminal 12. The contact plate 24 is resilient and is held by the retaining wire 50 in a prestressed position above the contact part 14, which is connected to the electrically conductive housing upper part. The bridging element is triggered by melting (burning through) of the retaining wire 50 by conducting a suitable current or current pulse through the retaining wire 50 via the trigger signal line 23. The retaining wire 50 preferably has a diameter in the range of from 0.1 to 0.2 mm. A maximum trigger energy in the region of from 0.5 J can thus be achieved. The tensile strength is sufficient here to withstand contact forces of several Newton and thus hold a sufficiently thick contact plate, by means of which an electrical resistance of less than 100 µΩ is achieved in the triggered state.

Figure 3:
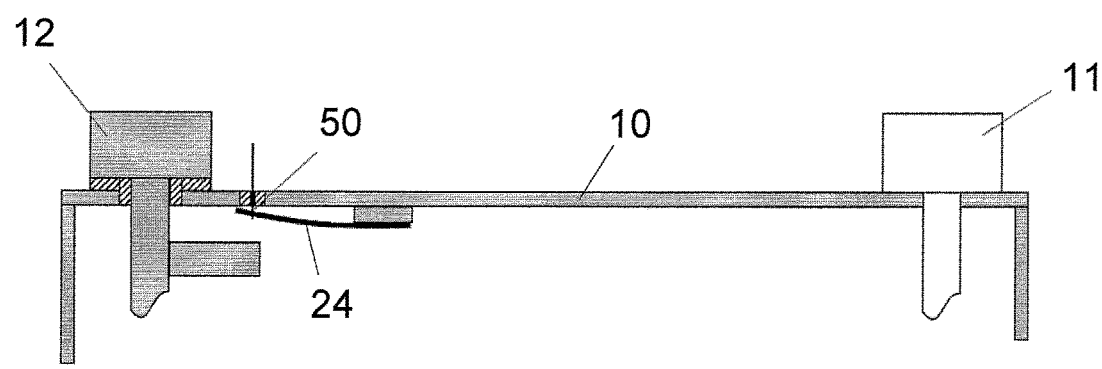
FIG. 3 shows a third example of an embodiment of the bridging device on the energy storage cell
Figure 3:
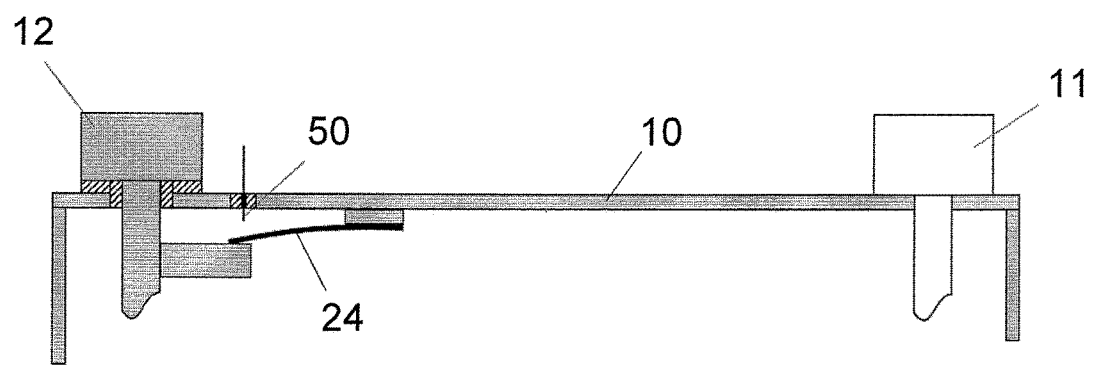

This bridging element can be integrated both outside (as in FIG. 2) and inside (as shown schematically in FIG. 3) the cell housing 10. In this embodiment the contact plate 24 is connected to the electrically conductive housing 10 and a suitable mating surface is formed on the first battery terminal 12 within the housing, against which mating surface the tensioned contact plate 24 is pressed in the triggered state. The non-triggered state is shown schematically in the upper sub-image of FIG. 3, and the triggered state is shown schematically in the lower sub-image of FIG. 3. The retaining wire 50 is guided in this embodiment through the housing 10 via an insulated feedthrough.

LIST OF REFERENCE SIGNS 10 battery cell housing
11 second battery terminal
12 first battery terminal
14 electrically conductive contact part
15 insulation body
16 coating with solder material
17 contact plates
17b printed circuit board
17c upper-side metallisation
17d via
18 solder coating
19 reactive nano foil
20 spring element
21 upper insulation body
22 coating with solder material
23 trigger signal line
24 electrically conductive plate
25 centring structure
26 recess
50 retaining wire

The invention claimed is:

1. An electrical energy storage cell comprising
an at least partially electrically conductive housing,
at least two terminals on the electrically conductive housing, of which a first terminal is insulated from the housing and a second terminal is electrically conductively connected to the housing, and
a bridging device, which can be actuated by an external signal to connect the two terminals of the energy storage cell electrically to one another,
wherein the bridging device acts between the first terminal and the housing of the energy storage cell,
wherein the bridging device, when actuated by the external signal, produces an electrically conductive connection between a first electrical conductor and a second electrical conductor, wherein the first electrical conductor is connected to the first terminal or is formed by the first terminal and the second electrical conductor is connected to the housing, and
wherein the first and second electrical conductor are arranged such that at least one first surface region of the first conductor oriented in one spatial direction is distanced by a gap from at least one second surface region of the second conductor oriented in the same spatial direction, an electrically conductive bridging element is arranged above the two surface regions, the surface regions and/or a side of the bridging element directed towards the surface regions are provided with a solderable electrically conductive coating, and
a reactive element is arranged above the surface regions, in which reactive element an exothermic reaction is triggered by the actuation of the bridging device by the external signal, the heat generated by said reaction fusing the solderable layers to one another and/or producing a soldered connection between the bridging element and the two electrical conductors.

2. The energy storage cell according to claim 1, wherein the bridging device is integrated in the first terminal of the energy storage cell.

3. The energy storage cell according to claim 1, wherein the bridging element comprises a reactive layer as the reactive element.

4. The energy storage cell according to claim 1, wherein a trigger signal input of the bridging device, via which the bridging device can be actuated by the external signal, is electrically conductively connected to one of the electrical conductors via the bridging element.

5. The energy storage cell according to claim 1, wherein the bridging device is arranged partially or wholly within the housing.

6. An electrical energy storage cell comprising
an at least partially electrically conductive housing,
at least two terminals on the electrically conductive housing, of which a first terminal is insulated from the housing and a second terminal is electrically conductively connected to the housing, and
a bridging device, which can be actuated by an external signal to connect the two terminals of the energy storage cell electrically to one another,
wherein the bridging device acts between the first terminal and the housing of the energy storage cell,
wherein the bridging device, when actuated by the external signal, produces an electrically conductive connection between a first electrical conductor and a second electrical conductor, wherein the first electrical conductor is connected to the first terminal or is formed by the first terminal and the second electrical conductor is connected to the housing, and
wherein the bridging device comprises an electrically conductive bridging element which is formed by a resilient element or is connected to a resilient element, wherein the resilient element is held in a prestressed first state by a retaining wire and, when the retaining wire is severed or dissolved, transitions into a second state, in which the resilient element electrically connects the first and second electrical conductors via the electrically conductive bridging element.

7. The energy storage cell according to claim 6, wherein the bridging device is integrated in the first terminal of the energy storage cell.

8. The energy storage cell according to claim 6, wherein the retaining wire is designed such that it melts or burns through when the bridging device is actuated by the external signal.

9. The energy storage cell according to claim 6, wherein the first and second electrical conductor are arranged such that at least one first surface region of the first conductor oriented in one spatial direction is distanced by a gap from at least one second surface region of the second conductor oriented in the same spatial direction, the bridging element is arranged above the two surface regions and is connected to the resilient element such that the resilient element presses the bridging element against the surface regions of the two electrical conductors when the retaining wire is severed or dissolved.

10. The energy storage cell according to claim 9, wherein the surface regions and/or a side of the bridging element directed towards the surface regions are/is provided with a solderable electrically conductive coating, and a reactive element is arranged above the surface regions, in which reactive element an exothermic reaction is triggered by the actuation of the bridging device by the external signal, the heat generated by said reaction fusing the solderable layers to one another and/or producing a soldered connection between the bridging element and the two electrical conductors.

11. The energy storage cell according to claim 10, wherein the bridging element comprises a reactive layer as the reactive element.

12. The energy storage cell according to claim 6, wherein the electrically conductive bridging element is formed as a resilient plate element which is fixedly connected to the first electrical conductor and is held in a curved, prestressed state at a distance from the second electrical conductor by the retaining wire.

13. The energy storage cell according to claim 6, wherein a trigger signal input of the bridging device, via which the bridging device can be actuated by the external signal, is electrically conductively connected to one of the electrical conductors via the bridging element.

14. The energy storage cell according to claim 6, wherein the bridging device is arranged partially or wholly within the housing.

* * * * *